F. H. WADE & W. E. BAUERLE.
DOUBLE CURRENT GENERATOR.
APPLICATION FILED APR. 24, 1912.

1,097,742.

Patented May 26, 1914.

UNITED STATES PATENT OFFICE.

FRANK H. WADE, OF CHICAGO, AND WALTER E. BAUERLE, OF OAK PARK, ILLINOIS.

DOUBLE-CURRENT GENERATOR.

1,097,742.  Specification of Letters Patent.  Patented May 26, 1914.

Application filed April 24, 1912. Serial No. 692,892.

*To all whom it may concern:*

Be it known that we, FRANK H. WADE and WALTER E. BAUERLE, citizens of the United States of America, and residents of Chicago and Oak Park, respectively, county of Cook, and State of Illinois, have invented certain new and useful Improvements in Double-Current Generators, of which the following is a specification.

The main objects of this invention are to provide an improved device adapted to convert the usual single phase generator into a double current generator, and to provide an improved device adapted to be used with the usual motor driven single phase magneto for charging a storage battery or restoring a dry battery, and maintaining either at their maximum E. M. F.; to provide an improved arrangement of the circuits connecting said device, magneto and battery, whereby said magneto may be used for operating an ignition system, or charging said battery, and whereby said battery may be used for the purpose of operating said ignition system or lamps, or both; to provide a device of this kind which will automatically deliver the peak current wave in a constant direction independently of the direction of rotation of the magneto; to provide improved means which will automatically cut in and cut out at the proper E. M. F. values of the peak of the current wave; and to provide an improved arrangement of the device and circuit by which the self induction of the single phase magneto circuit compensates the maximum current values so as to be substantially independent of speed, frequency and voltage of the magneto.

An illustrative embodiment of this invention is shown in the accompanying drawings in which—

Figure 1 is a diagrammatic view of a circuit arrangement and a rectifying device constructed according to this invention, and their relative connection to and operation by a single phase magneto. Fig. 2 is an enlarged detail of the rectifying device. Fig. 3 is an end elevation, partly sectional, of the same taken on the line A—A of Fig. 2. Fig. 4 is a diagram of a cycle of the current wave.

In the construction shown in the drawings, the magneto 1 is of usual construction comprising a shaft 2 on which is mounted the single coil or winding 3. One end of the coil or winding is grounded to the frame as diagrammatically represented at 4. The opposite end of the winding extends through a longitudinal bore in the shaft 2 protruding outwardly from the end thereof and forming the terminal 5 against which bears the spring contact or brush 6. This end of the wire is, of course, insulated from the shaft and the brush 6 takes off an alternating current from the rotor. The shaft 2 is extended and has loosely mounted thereon a member or disk 7, preferably of fiber, which is adapted to be rotated with the shaft by means of an arm or lug 8 carried by the shaft and adapted to engage one or the other of the shoulders or studs 9 and 10. The studs 9 and 10 are symmetrically arranged on one side of the disk 7, being spaced apart angularly so that the arm 8 travels through 180 degrees in moving from one stud to another. The studs 9 and 10 are connected together electrically by the conductor 11, and are also adapted to be electrically connected with a metallic segment 12 carried on the periphery of the disk, by means of an automatic switch or cut out. The automatic switch or cut out comprises a spring arm 13 secured in the recess 14 and electrically connected to the segment 12, by the bolt 15, and is adapted to engage the contact 16 connected to the stud 10. The spring 13 normally occupies the position as shown in Fig. 3 until the speed of the disk exceeds a certain predetermined value; when, due to centrifugal action the end of the spring 13 which serves as the contact 17, is thrown outwardly against the contact 16.

A conductor 18 is tapped in on the winding 3 in shunt with the conductor 5 and is connected to the contacts 19 and 20 carried on respectively opposite sides of the arm 8 and arranged to abut against the studs 9 and 10 for completing the circuit from said studs to the magneto winding, when the magneto is rotated in either direction. A brush 21 is arranged to bear upon the periphery of the disk 7 for taking off current from the magneto when the end of the contacts 18 or 20 engage the respective stud 9 or 10, and the speed of the disk is sufficient to cause the engagement of the contacts 16 and 17.

A storage battery 22 has one of its terminals connected by a circuit 23 to the brush 21, the other terminal being connected to a ground 24 by the circuit 25. An ignition system comprising the usual spark coil 26 and timer 27 is connected by the circuit 28 to the battery 22 and to the circuit 23 leading from the brush 21, the opposite end of the ignition circuit being grounded as indicated at 29. Lamps 30 are connected by a circuit 31 to a double throw, single pole, switch 32 by which they may be connected so as to take current from the brush 6 through the circuit 33 or from the battery 22 through the circuit 34, the opposite end circuit being completed to the ground 35. In case the self-induction of the usual armature winding is not sufficient to hold the maximum current wave at a substantially constant value, there can be inserted in the circuits 23 and 33 self-induction as diagrammatically indicated at 36 and 37 respectively. A single pole, single throw switch 38 may be placed in the circuit 28 so that the circuit can be opened if found expedient.

The operation of the device is as follows: The magneto 1 is operated in the usual manner and current is taken off therefrom by the brush 6 for operating the lamps 30, provided the switch 32 is shifted to connect the circuits 31 and 33. If the shaft 2 is rotated in a direction toward the left of Fig. 3, the arm 8 is shifted to abut against the stud 10 which brings the contact 20 carried by the arm 8 into electrical engagement with said stud thereby completing the circuit to the armature winding 3 through the conductor 18. As the speed of the armature increases and exceeds a certain predetermined value sufficient for the winding to produce a voltage greater than the voltage of the battery 22, the spring 13 is thrown outwardly through centrifugal action to cause engagement of the contacts 16 and 17. The engagement of the contacts 16 and 17 brings the segment 12 into electrical connection with the stud 10, whereupon current is intermittently taken off from the armature winding. The arrangement of the segment 12 and brush 21 is such that the current will be taken off during a certain predetermined portion of the peak of the wave current, as indicated by the line 36 of Fig. 4. Current thus taken off is conducted from the brush 21 by means of circuit 23 to the battery 22 which it charges so as to restore its E. M. F. or maintain the battery at its maximum E. M. F. If the speed of the armature falls below a value which would cause the armature to produce a lower voltage than the voltage of the battery, the spring 13 opens the circuit leading from the armature to the battery so that current from the battery will not travel to the armature. If the direction of rotation of the armature is reversed, the disk 7 remains stationary during an angular movement of 180 degrees of the arm 8, so that when the contact 19 engages the stud 9 the device will take off current from the armature in the same manner as just described, the circuit from the stud 9 being completed through the conductor 11 to the stud 10. If it is desired to operate the lamps 30 by the battery 22, the switch 32 may be thrown to complete the circuits 31 and 34. It will be apparent to those skilled in the art that the same result can be accomplished by the use of a plurality of segments instead of a single segment as herein described.

Although but one specific embodiment of this invention has been herein shown and described, it will be understood that numerous details of the construction shown may be altered or omitted without departing from the spirit of this invention as defined by the following claims.

We claim:—

1. The combination with a single phase electric generator having a wound rotor, of a member mounted to rotate with said rotor, a metallic segment carried by said member, means forming an electrical connection between said segment and rotor winding, and a brush adapted to contact with said segment during a certain predetermined angular movement of said member for taking off current only during a certain angular movement of said rotor, said means including mechanism adapted to make and break the circuit to said segment when the speed of said rotor respectively exceeds or falls below a certain predetermined value, for the purpose specified.

2. The combination with an electric generator, of a rotor having a single winding thereon, of a member mounted to rotate with said rotor, a metallic segment carried by said member, a pair of contacts respectively connected with said segment and said rotor winding, means normally urging said contacts apart and adapted to be centrifugally controlled for shifting said contacts into engagement when the speed of said member has reached a predetermined value, and a brush adapted to contact with said segment during a certain predetermined angular movement of said member, for the purpose specified.

3. The combination with an electric generator, of a rotor having a single winding thereon, of a member mounted to rotate with said rotor, a metallic segment carried by said member, a pair of contacts carried by said member and respectively connected with said segment and said rotor winding, means normally urging said contacts apart and adapted to be centrifugally controlled for shifting said contacts into engagement when the speed of said member has reached a predetermined value, and a brush adapted to contact with said segment during a certain predetermined angular movement of said member, for the purpose specified.

4. The combination with an electric generator comprising a rotor having a single winding thereon, of a shaft rotated by said rotor, a disk loosely mounted on said shaft, a metallic segment carried on the periphery of said disk, a brush engaging with the periphery of said disk, an arm fixed to rotate with said shaft, a pair of shoulders spaced apart on said disk and adapted to be respectively engaged by said arm for rotating said disk with said shaft in respectively opposite directions, contacts on said arm adapted to make electrical connection with a part of said shoulders, conductors respectively connecting the contacts on said arm with said rotor winding and said shoulders with said segment, for the purpose specified.

5. The combination with an electric generator comprising a rotor having a single winding thereon, of a shaft rotated by said rotor, a disk loosely mounted on said shaft, a metallic segment carried on the periphery of said disk, a brush normally engaging with the periphery of said disk, an arm fixed to rotate with said shaft, a pair of shoulders spaced apart on said disk and adapted to be respectively engaged by said arm for rotating said disk with said shaft in respectively opposite directions, contacts on said arm adapted to make electrical connection with a part of said shoulders, conductors respectively connecting the contacts on said arm with said rotor winding and said shoulders with said segment, a pair of contacts carried by said disk and respectively connected to said segment and one of said shoulders, and means normally urging said contacts apart and adapted to be centrifugally controlled for shifting said contacts into engagement when the speed of said disk has reached a predetermined value for the purpose specified.

6. The combination with an electric generator comprising a rotor having a single winding thereon, of a shaft rotated by said rotor and having one end of said winding extending through said shaft to the end thereof, a brush normally engaging the end of said winding, a disk loosely mounted on said shaft, a metallic segment carried on the periphery of said disk, a brush engaging the periphery of said disk, an arm carried by said shaft, a pair of shoulders carried by said disk and electrically connected with said contact, said shoulders being adapted to be respectively engaged by said arm for shifting said disk in respectively opposite directions, a pair of contacts carried by said arm and adapted to respectively engage said shoulders, and a conductor connecting said contacts with said rotor winding, for the purpose specified.

7. The combination with an electric generator comprising a rotor having a single winding thereon, of a shaft rotated by said rotor and having one end of said winding extending through said shaft to the end thereof, a brush normally engaging the end of said winding, a disk loosely mounted on said shaft, a metallic segment carried on the periphery of said disk, a brush engaging the periphery of said disk, an arm carried by said shaft, a pair of shoulders carried by said disk and electrically connected with said contact, said shoulders being adapted to be respectively engaged by said arm for shifting said disk in respectively opposite directions, a pair of contacts carried by said arm and adapted to respectively engage said shoulders, a conductor connecting said contacts with said rotor winding, a battery, an electric consuming device, a circuit connecting said device with said first brush, a circuit connecting said battery with said second brush, and self induction means interposed in both of said circuits.

8. The combination with a single phase electric generator having a wound rotor, of a member, a metallic segment carried by said member, means adapted to form an electrical connection between said segment and rotor winding when the E. M. F. of said generator exceeds a certain predetermined value, and a brush adapted to contact with said segment, said member and brush being connected to said rotor to have relative motion substantially as and for the purpose specified.

Signed at Chicago this 9th day of April 1912.

FRANK H. WADE.
WALTER E. BAUERLE.

Witnesses:
PHILIP B. WOODWORTH,
EDWIN PHELPS.